US012190242B2

(12) United States Patent
Nassi et al.

(10) Patent No.: US 12,190,242 B2
(45) Date of Patent: Jan. 7, 2025

(54) METHODS FOR DETECTING PHANTOM PROJECTION ATTACKS AGAINST COMPUTER VISION ALGORITHMS

(71) Applicant: B. G. NEGEV TECHNOLOGIES AND APPLICATIONS LTD., Beer Sheva (IL)

(72) Inventors: Ben Nassi, Ramat-Gan (IL); Yuval Elovici, Arugot (IL); Yisroel Avraham Mirsky, Beer Sheva (IL); Dudi Nassi, Holon (IL); Raz Ben Nethanel, Petah Tikva (IL)

(73) Assignee: B. G. NEGEV TECHNOLOGIES AND APPLICATIONS LTD., Beer Sheva (IL)

( * ) Notice: Subject to any disclaimer, the term of this patent is extended or adjusted under 35 U.S.C. 154(b) by 414 days.

(21) Appl. No.: 17/779,774

(22) PCT Filed: Nov. 25, 2020

(86) PCT No.: PCT/IL2020/051211
§ 371 (c)(1),
(2) Date: May 25, 2022

(87) PCT Pub. No.: WO2021/105985
PCT Pub. Date: Jun. 3, 2021

(65) Prior Publication Data
US 2023/0015771 A1    Jan. 19, 2023

Related U.S. Application Data

(60) Provisional application No. 62/940,280, filed on Nov. 26, 2019.

(51) Int. Cl.
*G06N 3/08*    (2023.01)
*G06V 10/25*   (2022.01)
(Continued)

(52) U.S. Cl.
CPC ............... *G06N 3/08* (2013.01); *G06V 10/25* (2022.01); *G06V 10/267* (2022.01); *G06V 10/82* (2022.01);
(Continued)

(58) Field of Classification Search
CPC .......... G06N 3/08; G06N 3/045; G06V 10/25; G06V 10/267; G06V 10/82; G06V 20/56;
(Continued)

(56) References Cited

U.S. PATENT DOCUMENTS 11,328,602 B2 *  5/2022  Sherony ............ B60W 60/0015
11,961,203 B2 *  4/2024  Lim ........................ G06N 3/08
(Continued)

OTHER PUBLICATIONS

Xu Y, Basset G. Virtual motion camouflage based phantom track generation through cooperative electronic combat air vehicles. Automatica. Sep. 1, 2010;46(9):1454-61. (Year: 2010).*
(Continued)

*Primary Examiner* — Fayyaz Alam
(74) *Attorney, Agent, or Firm* — NKL Law; Jae Youn Kim

(57) ABSTRACT

A system and methods are provided for determining a vehicle action during a phantom projection attack, including processing a received image to identify a traffic object, and creating from the received image multiple processed images that are applied to respective neural network (NN) models. Latent representations of the multiple processed images from each of the NN models are then fed to a combiner model trained to determine whether the latent representations indicate a phantom projection attack, and, responsively to a determination of a phantom projection attack, issuing a phantom projection indicator.

20 Claims, 7 Drawing Sheets
(4 of 7 Drawing Sheet(s) Filed in Color)

(51) Int. Cl.
  *G06V 10/26* (2022.01)
  *G06V 10/82* (2022.01)
  *G06V 20/00* (2022.01)
  *G06V 20/56* (2022.01)
  *G06V 20/58* (2022.01)
  *B60W 60/00* (2020.01)

(52) U.S. Cl.
  CPC .............. *G06V 20/56* (2022.01); *G06V 20/58* (2022.01); *G06V 20/95* (2022.01); *B60W 60/001* (2020.02); *B60W 2420/403* (2013.01); *B60W 2554/00* (2020.02); *G06V 2201/08* (2022.01)

(58) Field of Classification Search
  CPC .... G06V 20/58; G06V 20/95; G06V 2201/08; B60W 60/001; B60W 2420/403; G06F 18/254; G08G 1/166
  See application file for complete search history.

(56) References Cited

U.S. PATENT DOCUMENTS

| 2019/0065871 | A1  | 2/2019  | Pogorelik |
| 2019/0225234 | A1* | 7/2019  | Kumar ............. B60W 50/0205 |
| 2019/0258251 | A1* | 8/2019  | Ditty .................... G05D 1/0274 |
| 2020/0364892 | A1* | 11/2020 | Ko ......................... G05D 1/12 |

OTHER PUBLICATIONS

Zhang X, Chandramouli K. Critical infrastructure security against drone attacks using visual analytics. InInternational conference on computer vision systems Sep. 23, 2019 (pp. 713-722). Cham: Springer International Publishing. (Year: 2019).*

Kevin Eykholt et al.; "Robust Physical-World Attacks on Deep Learning Visual Classification", Research, Apr. 10, 2018, pp. 1-11.

Yulong Cao et al.; "Adversarial Sensor Attack on LiDAR-based Perception in Autonomous Driving", Research, Aug. 20, 2019, pp. 1-15.

* cited by examiner

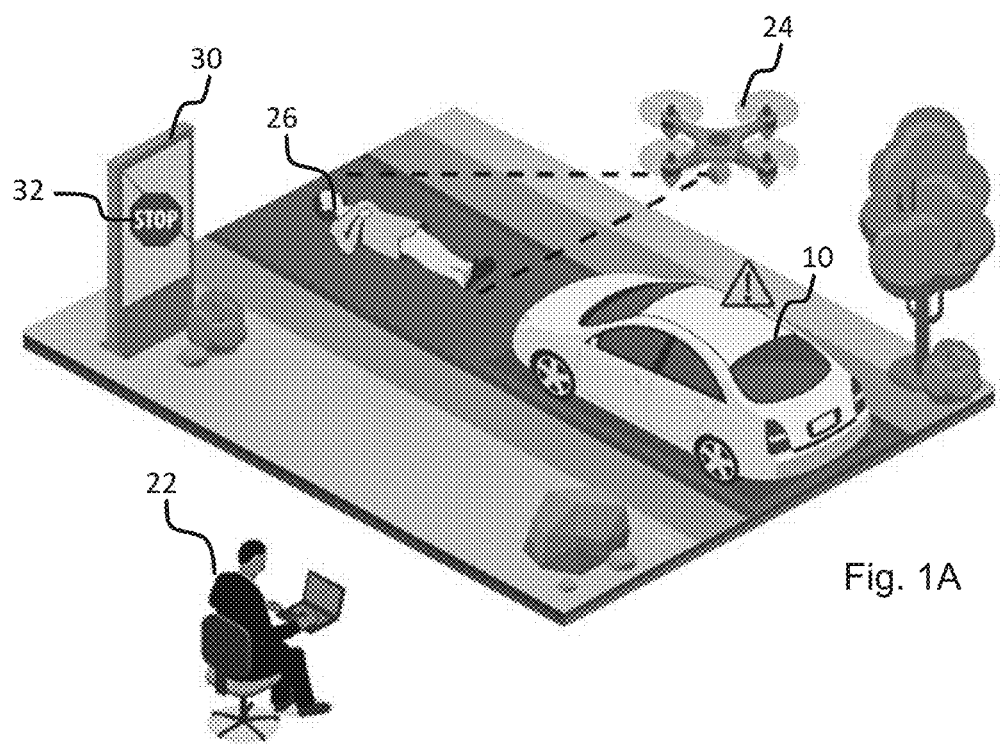
Fig. 1B  Fig. 1C  Fig. 1D

Real Objects Detected

Phantom Objects Detected

METHODS FOR DETECTING PHANTOM PROJECTION ATTACKS AGAINST COMPUTER VISION ALGORITHMS

CROSS REFERENCES TO RELATED APPLICATIONS

This application is a U.S. national phase entry of, and claims priority to, PCT International Patent Application No. PCT/IL2020/051211, filed Nov. 25, 2020, which claims priority to U.S. Provisional Patent Application No. 62/940,280, filed Nov. 26, 2019. The entire contents of the above-referenced applications and of all priority documents referenced in the Application Data Sheet filed herewith are hereby incorporated by reference for all purposes.

FIELD OF THE INVENTION

The present invention generally relates to the field of autonomous vehicles and in particular autonomous vehicle control.

BACKGROUND

Advanced driver assistance systems (ADASs) are supporting and gradually replacing manual driving. ADASs utilize artificial intelligence (AI) models to process data obtained from various sensors in real-time in order to guide a vehicle. AI processes include the ability to recognize traffic signs, to steer a vehicle away from obstacles, and to trigger an alert when the car deviates from its lane. However, because these systems rely heavily on image input, they have also been shown to be vulnerable to forms of visual attack, whereby images are projected in the path of ADAS vehicles.

One such form of attack is a "split second phantom attack," which involves an attacker projecting or digitally displaying an image (i.e., a "phantom projection") in the path of a vehicle for only a brief instant, such as a few milliseconds. Split-second phantom attacks fool AI models by presenting an image for the minimum amount of time required to be captured by a camera of the ADAS, while remaining imperceptible to the human eye. As described by the inventors of the present invention in Nassi, et al. "Phantom of the ADAS: Securing Advanced Driver-Assistance Systems from Split-Second Phantom Attacks," in *Proceedings of the 2020 ACM SIGSAC Conference on Computer and Communications Security (CCS'20)*, Nov. 9-13, 2020, which is incorporated herein by reference, embedding phantom road signs into an advertisement presented on a digital billboard has been shown to cause ADASs to suddenly stop vehicles and to issue false notifications. Similarly, images projected onto solid surfaces in the camera view of ADASs may also be mistaken for real objects, such as traffic signs or pedestrians.

Such attacks are all the more threatening because attackers may be able to operate with little risk of detection. The risk of detection is small because (1) there is no need for an attacker to physically approach the attack scene (e.g., a drone can be operated to project the phantom projection on a wall, or a digital billboard can be hacked to display it), (2) no identifying physical evidence is left behind, and (3) a human vehicle operator (i.e., a driver and/or passenger of the autonomous vehicle) is unlikely to detect the attack because it is so brief, meaning that the operator is also unlikely to prevent the attack by exercising appropriate control over the vehicle.

One approach that might be considered for overcoming split-second phantom attacks might be to increase the period of time that a detected object must appear in the video stream before the object is treated as real. However, because ADASs must be able to react in real time to an obstacle that suddenly appears on the road, setting a time period that is too long (e.g., one second) may make it impossible for the ADAS to react in a timely manner.

These shortcomings and others are addressed by embodiments of the present invention.

SUMMARY

Embodiments of the present invention provide a system and methods for determining that an object detected by a vehicle ADAS is a phantom projection. A system and method are provided including receiving an image from an image sensor, wherein the received image includes surroundings of the vehicle; processing the received image to identify a traffic object in the image; creating multiple processed images from the received image, wherein each processed image highlights a different distinct aspect of the image; applying multiple processed images to multiple respective neural network (NN) aspect models trained to correlate the distinct aspect of each processed image with a phantom projection attack; applying latent representations of the multiple processed images from each of the NN aspect models to a NN combiner model trained to determine whether the latent representations indicate a phantom projection attack; and responsively to a determination by the NN combiner model that there is a phantom projection attack, issuing a phantom projection indicator to a decision module, typically a decision module of the ADAS.

Some embodiments further comprise applying the phantom projection indicator to a process for determining a vehicle action, which may be implemented by the decision module.

The traffic object may be a traffic sign, a traffic light, a road obstacle, a second vehicle, and a pedestrian. In some embodiments, the multiple NN aspect models may include four models: a context model, a surface model, a light model, and a depth model.

A processed image applied to the context model may be generated by centering a region of the received image around the identified traffic object and blanking the identified traffic object from the processed image. A processed image applied to the surface model may be generated by cropping the received image to a region of the identified traffic object. The surface model may include a correlation between unrealistic patterns in the processed image with a phantom projection attack.

A processed image applied to the light model may be generated by cropping the received image to a region of the identified traffic object and converting each pixel of the image to the value of the maximum of the red, green, or blue value of the pixel.

A processed image applied to the depth model may be generated by cropping the received image to a region of the identified traffic object and converting each pixel of the image to a value representing a direction and magnitude of an optical flow, indicating a transition of a pixel from a pixel position in a prior received image.

Identifying the traffic object may also include identifying multiple traffic objects and applying the aspect models and the combiner model to determine the likelihood output for each of the multiple traffic objects.

The phantom projection that is detected is typically projected for less than a second and is typically implemented by attackers using a portable projector or a digital billboard.

BRIEF DESCRIPTION OF DRAWINGS

The patent or application file contains at least one drawing/photograph executed in color. Copies of this patent or patent application with color drawing(s)/photograph(s) will be provided by the Office upon request and payment of the necessary fee.

For a better understanding of various embodiments of the invention and to show how the same may be carried into effect, reference will now be made, by way of example, to the accompanying drawings. Structural details of the invention are shown to provide a fundamental understanding of the invention, the description, taken with the drawings, making apparent to those skilled in the art how the several forms of the invention may be embodied in practice. In the figures:

FIGS. 1A-1D are schematic views of phantom projection attacks perpetrated against an advanced driver-assistance system (ADAS), in accordance with an embodiment of the present invention;

DETAILED DESCRIPTION

Figure 2:
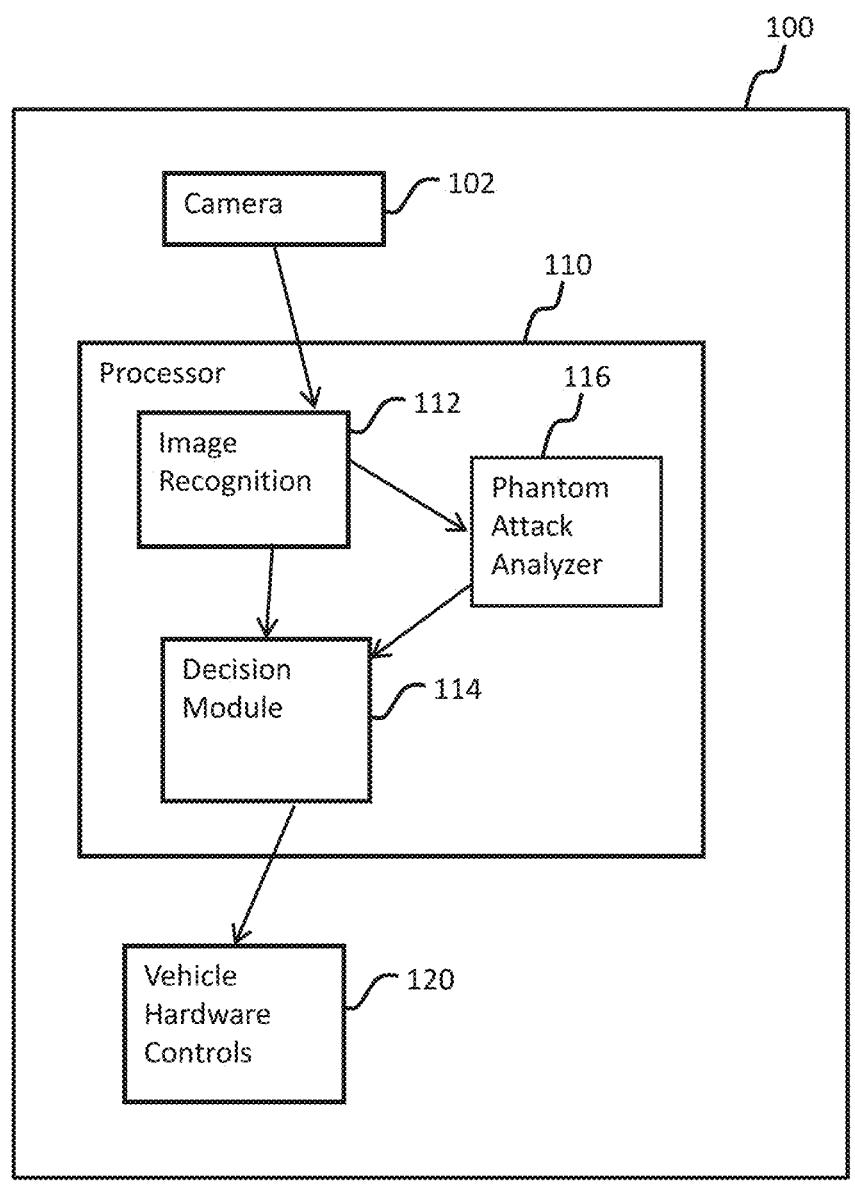
FIG. 2 is a schematic block diagram of an ADAS configured to identify a phantom projection and responsively to determine a vehicle action, in accordance with an embodiment of the present invention.

Embodiments of the present invention provide a system and methods for preventing phantom projection attacks against vehicles with advanced driver assistance systems (ADASs). Phantom projection attacks are understood to be projections of objects that cause ADASs to take action, either by proactively controlling a vehicle or by alerting a driver. Such objects may be road obstacles that should be avoided, or traffic signs such as speed limits or stop signs, which may determine a vehicle's movement. Objects to which ADASs are trained to react are referred to hereinbelow as "traffic objects," or simply "detected objects." It is understood that phantom projections may be displayed in the view of a vehicle for brief periods, for example periods of time that are just long enough to be recognized by an ADAS, but too short for the vehicle operator to notice, such as $\frac{1}{10}$ sec.

FIG. 1A is a schematic diagram of a vehicle 10 operating in a scenario 20 that demonstrates two of the types of phantom projection attacks that may be perpetrated. Vehicle 10 is assumed to be a semi-autonomous or autonomous vehicle. Such a vehicle would be rated at levels 1-5 of the Society of Automotive Engineers (SAE) ratings for autonomous vehicles. Such vehicles include an ADAS including one or more sensors for sensing images and/or distances of objects in the vehicle's surroundings. Hereinbelow, it is understood that at least one of the sensors is an image sensor, e.g., a video camera, configured to acquire images in the sensor's view.

As indicated in scenario 20, phantom projection attacks may be carried out by a remote perpetrator 22, i.e., a perpetrator not visible to an operator of the vehicle 10. In one type of attack shown, the perpetrator 22 operates a drone 24 that is configured to project an image of an obstacle onto a road, in this case, a human image 26 projected onto the road in front of the vehicle. Similar projections may be implemented by a concealed projector located in the vicinity of the road, such as a portable DLP projector. In a second type of phantom projection attack, the perpetrator operates (typically through hacking) a system controlling a digital billboard 30. The perpetrator causes a phantom projection, such as a traffic sign 32, to be displayed on the digital billboard. As described by Nassi et al., in the abovementioned article, embedded images in billboards may be positioned in a block of a digital advertisement that would be less noticed by a driver, and appearance the phantom projection may be timed to appear in a minimum number of frames required for the camera of the ADAS to acquire the phantom projection.

FIGS. 1B-1D show additional examples of phantom projection attacks that may be executed against a vehicle with an ADAS. These include projections of traffic signs on a vehicle (FIG. 1B), on a pedestrian (FIG. 1C), and on a tree (FIG. 1D).

Tests on generating phantom projections show that as the distance between the ADAS and the projected image increases, a stronger light level of the projection is required in order for an ADAS to detect the image. It is easier to apply phantom attacks at night (i.e., in the dark) with weak projectors than during the day, given that there is no ambient light at night, whereas ambient light during the day is 1,000 to 2,000 lux. ADASs that have multiple video cameras are typically more sensitive and can detect phantom projections that are displayed with lower light levels.

FIG. 2 is a schematic diagram of an ADAS 100 that is configured to identify a phantom projection and responsively to determine a vehicle action, in accordance with an embodiment of the present invention. The ADAS has at least one image sensor, e.g., a camera 102, which acquires images (i.e., video frames) from the surroundings of a vehicle.

Each received image is then transmitted to a processor 110, which typically includes three processing modules (also referred to hereinbelow as "engines"): an image recognition module 112, a decision module 114, and a phantom attack analyzer 116. As described further hereinbelow, the image recognition module 112 is typically a machine learning (ML) engine (e.g., a convolutional neural network, or "CNN") that is trained to identify traffic objects appearing in the received image. As described above, traffic objects are any objects that affect the vehicle's operation, such as obstacles or traffic signs. The significance of these traffic objects may then be determined by the decision module 114, which may also be a machine learning engine trained to determine optimal (e.g., safest) vehicle actions given identified traffic objects. In embodiments of the present invention, the phantom attack analyzer 116 also provides input to the decision process of the decision module 114.

Actions determined by the decision module 114 are then applied to vehicle hardware controls 120. Depending on the ADAS level of autonomy, the hardware controls 120 may control an alert system for notifying a driver or maintaining a cruise control distance (i.e., autonomous level 1) or may control more aspects of the vehicle's operation, such as braking and steering (i.e., autonomous levels 2-5).

The phantom attack analyzer 116, as described below, is also typically a machine learning engine configured to receive both the received (i.e., "acquired") image and the identified traffic object from the image recognition module 112. The phantom attack analyzer is trained to determine from this input whether the traffic object is likely to be a phantom projection, and to provide this determination as additional input to the decision module 114.

As described further hereinbelow, the phantom attack analyzer 116 is typically configured to perform a "committee of experts" analysis, that is, it is trained to analyze in parallel different aspects of the received image and to reach a joint decision as to the whether the identified traffic object is a phantom projection. A "committee of experts" analysis is described in Jenq-Neng Hwang and Yu Hen Hu, "*Handbook of neural network signal processing,*" CRC press, 2001, which is incorporated herein by reference.

Figure 3:
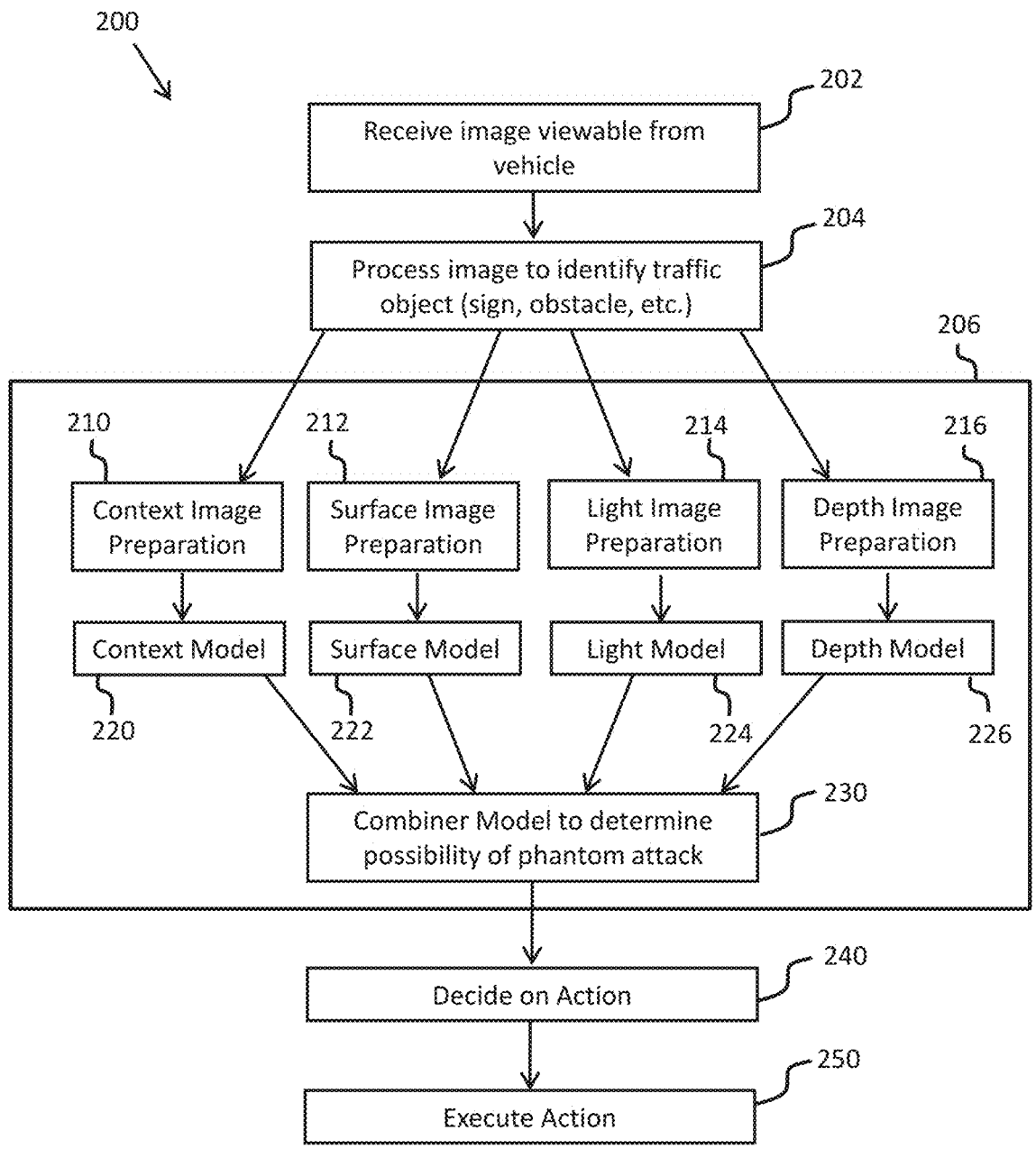
FIG. 3 is a schematic flow diagram of a process implemented by an ADAS for identifying a phantom projection and responsively determining a vehicle action, in accordance with an embodiment of the present invention.

FIG. 3 is a schematic flow diagram of a process 200 executed by an ADAS for identifying a phantom projection and responsively determining a vehicle action, in accordance with an embodiment of the present invention. At a first step 202, the ADAS receives an image from the camera, which is then processed at a step 204 by the image recognition module, as described above, to determine whether the image includes a traffic object to which the ADAS is trained to react (e.g., a traffic sign, an obstacle, a pedestrian, another vehicle, etc.).

After a traffic object is detected, processing continues with steps of a sub-process 206, which are performed by the phantom attack analyzer 116 described above. Steps of the sub-process 206 include generating cropped images that highlight different aspects of the acquired image with respect to the detected object. Subsequently, these images are processed by machine learning models trained to determining a correlation of each aspect with a likelihood that the identified traffic object is a phantom projection. The multiple analyses are then combined by a "committee of experts" correlation. Among the aspects of images that may be correlated with phantom projection attacks are the following:

Object Size: If the size of the detected object is larger or smaller than it should be, the detected object may be a phantom. For example, if a traffic sign is not a regulation size. The size and distance of an object can be determined by means of the camera sensors alone through stereoscopic imaging, though this requires multiple cameras directed in the same direction.

Object Angle: If the detected object is skewed in an anomalous way that does not match its placement in the image frame, it is indicative of a phantom. The skew of a 2D object appearing in an image changes depending on which side of the image frame the 2D object appears. Correlating the expected skew with actual skew can provide an indication of phantom likelihood. Anomalous skewing may occur if a phantom is projected at an angle onto a surface, or the surface does not directly face the camera.

Object Focus/Blurriness: For projected phantoms, the detected object may be blurry in regions outside of the projector's focal range. For example, when projected at an angle to the surface, especially when on a lumpy surface Object Context: If the scene surrounding the detected object is abnormal, it is indicative of a phantom. For example, a traffic sign may appear without being on a post or a pedestrian may appear floating over the ground.

Object Surface: If the surface of the detected object is distorted or lumpy, or has other patterns that do not match the typical features of the detected object, then it is likely a phantom. This may occur, for example, when a phantom projection is projected onto a brick wall or a bush.

Object Light Level: The detected object may be too bright with respect to the time of day or with respect to the location of the object (e.g., when in the shade). This evaluation of lighting may be determined through image analysis and/or by shining a light source onto the object (e.g., by using flash photography during the image acquisition).

Object Depth: If a 3D view of the detected object is abnormal, the detected object may be a phantom projection. A 3D view may be obtained from multiple images. As described below, a 3D analysis may be computed by a method of the optical flow between consecutive video frames acquired by the camera.

In an illustrative implementation of the invention, four aspects related to the detected object-context, surface, lighting, and depth—are analyzed by separate machine learning models, and the results are then combined to determine the likelihood of a phantom projection attack, that is, the likelihood of the detected object being a phantom projection.

Figure 4:
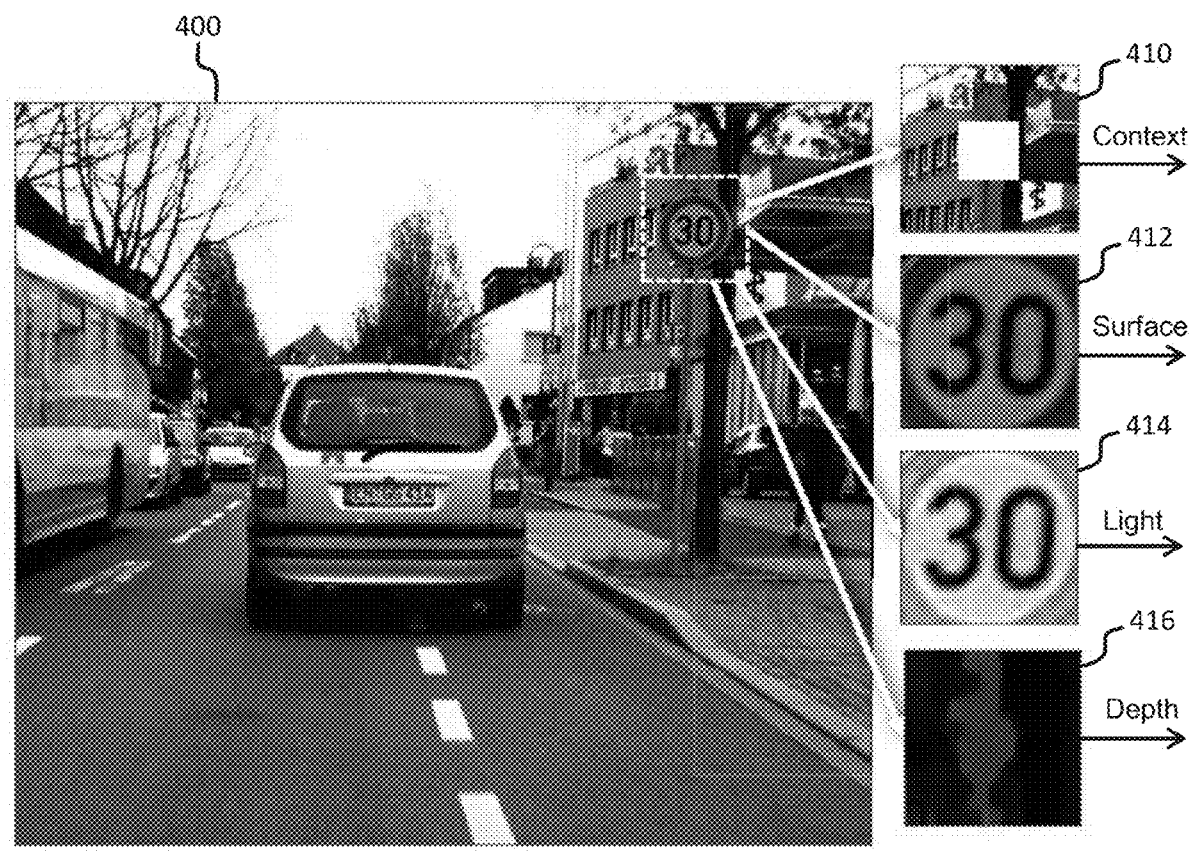
FIG. 4 presents a initial image acquired by an ADAS and subsequent images generated by the ADAS from the initial image, the subsequent images highlighting different aspects of the initial image that are correlated with phantom projections, in accordance with an embodiment of the present invention.

The acquired images are assumed to be color images, for example, images with 1920×1080×3 pixel resolution. An example of such an acquired image is shown as image 400 of FIG. 4. This acquired image is then processed to generate distinct aspect images that are also shown in FIG. 4. The steps of generated these aspect images are indicated in FIG. 3 as preparation steps 210-216, each of these steps generating a processed image that highlights a different image aspect. These processed images are then applied to their respective aspect models at analysis steps 220-226. Steps of image preparation and analysis are as follows:

Context Image (preparation step 210, analysis step 220): The context of the detected object may be indicated by a region of the acquired image that surrounds the detected object. To generate an appropriate "context image", the acquired image may first be cropped to a region that is, for example, ⅑ the area of the full acquired image. The cropped image may then be rescaled to a 128×128×3 pixel resolution. A central area of the rescaled image that includes the detected object, for example a centered box of 45×45 pixels, may then be "zeroed," i.e., blanked out. An example of such a processed context image is shown as image 410 in FIG. 4. Given a "labeled set" of such context images (wherein the labeling differentiates between context images based on locations of real objects, versus context images created from other locations), a machine learning "context model" may be trained to predict whether a detected object's context is indicative of a real object or a phantom projection. A new context image may then be applied to the context model at step 220 to make such a prediction. (In other words, the context model, which is typically a CNN, determines whether the position of a traffic object is logical with respect to the rest of the scene.)

Surface Image (preparation step 212, analysis step 222): An image highlighting the surface of the detected object may be generated by closely cropping the acquired image to create a rectangular image specifically of the detected object. Typically the cropped image is also rescaled to a 128×128×3 (RGB) pixel resolution. Such an image highlights any patterns that would be anomalous, such as a surface of a traffic sign showing tree leaves or brick patterns (i.e., a phantom projection of a traffic sign, projected onto bushes or onto a brick wall). An example of such a surface image is shown as image 412 in FIG. 4. Given a labeled set of such surface images (the labeled sets for surface, light, and depth models labeled according to whether detected objects are real or phantom projections), a machine learning "surface model" may be trained to predict whether a detected object's surface is indicative of a phantom projection. A new surface image may then be applied to the surface model at step 222 to make such a prediction.

Light Image (preparation step 214, analysis step 224): An image highlighting the brightness of the detected object may be an image closely cropped around the detected object, and then rescaled to 128×128×1 pixel resolution, i.e., a picture without the RGB triplet of color pixels. Each RGB triplet at each pixel position is converted to a single value, for example by taking the maximum value from among the three RGB values (i.e., the 'V' in the HSV image format). One example of such an "light image" is shown as image 414 in FIG. 4. Given a labeled set of such light images, a machine learning "light model" may be trained to predict whether a detected object's light reflection is indicative of a phantom projection. A new light image may then be applied to the light model at step 222 to make such a prediction. The goal of the light model is to detect whether a sign's lighting is irregular. On traffic signs, for example, the paint on the signs reflects light differently than the way light would appear if the sign was a phantom projection.

Depth Image (preparation step 216, analysis step 226): An image indicative of apparent depth of the detected object (or a distance of the detected object from the camera) can be calculated by an "optical flow" algorithm, based on comparing two consecutively acquired video frames. The optical flow is a 2D field of vectors, where each vector is calculated as the displacement of one or more pixels of a first image to the same pixels of a second image. As with the other processed images described above, the first and second images are first cropped to an area surrounding the detected object, for example an area of ⅑ the area of the acquired image. An optical flow calculation is described by Gunnar Farneback, in "Two-frame motion estimation based on polynomial expansion," *Scandinavian conference on Image analysis*. Springer, 363-370 (2003), which is incorporated herein by reference. With OpenCV, or similar tools for real-time computer vision, the Gunner Farneback algorithm for optical flow may be applied to obtain a 2D field v, which is then converted to a 3D HSV image format by computing each vector's angle and magnitude, such that the three dimensions x[i,j,k] of an HSV image may be calculated as follows:

$$x[i,j,0]=\sin^{-1}(v[i,j,1]/\sqrt{v[i,j,0]^2})\times 180/2\pi$$

$$x[i,j,1]=255$$

$$x[i,j,2]=\text{norm\_minmax}(\sqrt{v[i,j,0]^2+v[i,j,1]^2})*255$$

The HSV image is then converted to an RGB formatted "depth image." One example of such an image is shown as image 416 in FIG. 4. Given a labeled set of such depth images, a machine learning "depth model" may be trained to predict whether a detected object's depth is indicative of a phantom projection. A new depth image may then be generated from a newly acquired image, and then applied to the depth model at step 226 to make such a prediction.

The optical flow method of creating the depth image provides an implicit 3D view of the scenery while the vehicle is in motion. This enables the model to perceive the sign's placement and shape using only one camera.

To make a prediction as to whether or not a detected object is real or fake (i.e., a phantom projection), combined knowledge from the four models is applied to a combiner model to make a final prediction of the phantom projection attack likelihood, at a step 230. The result of this decision is then provided to the decision model 114 at decision step 240. The decision step typically acts according to a set of rules to determine a vehicle action, which is then performed by the hardware controls 120 at an action step 250.

Figure 5:
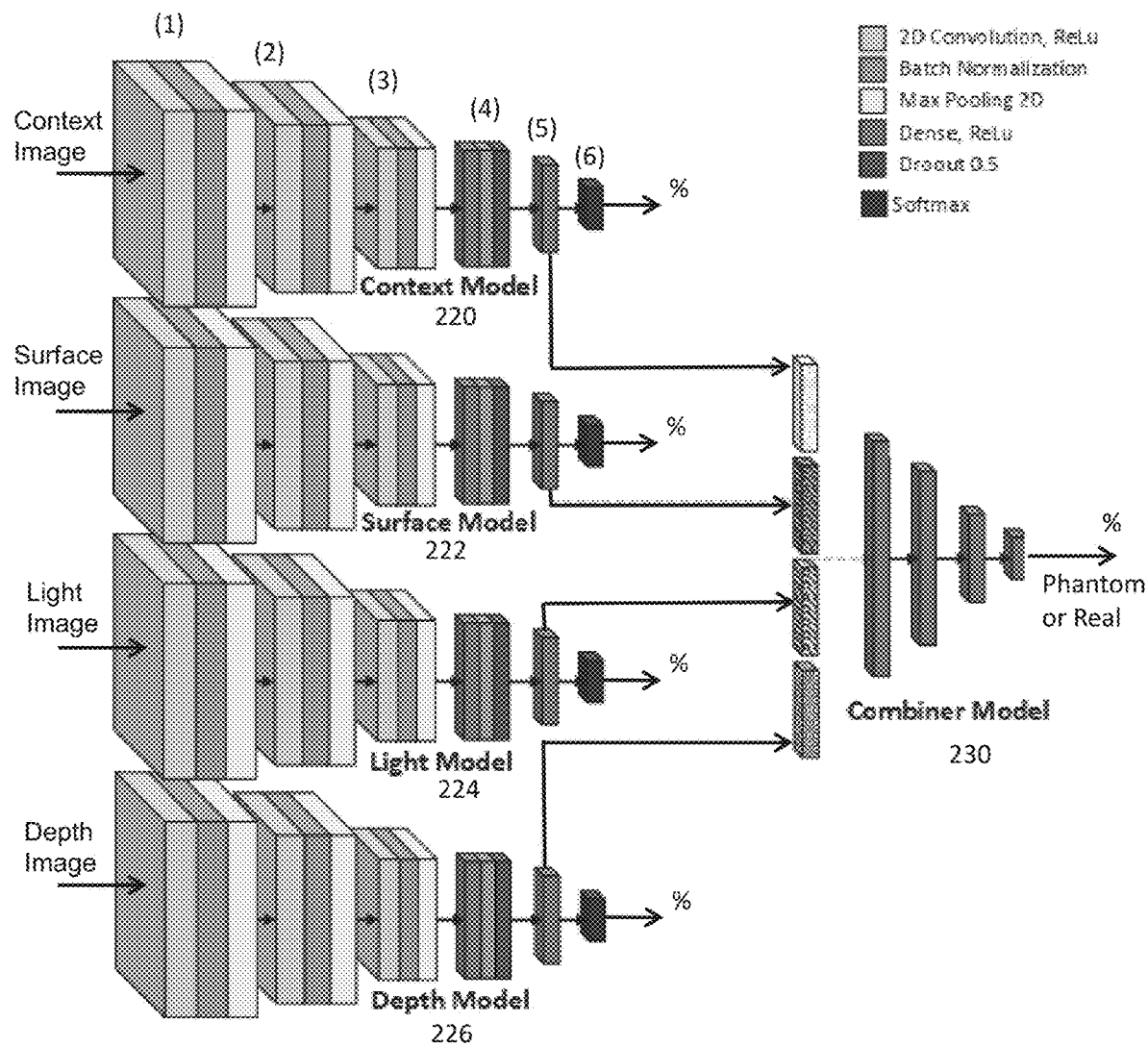
FIG. 5 is a schematic flow diagram of a set of neural networks, configured as committee of experts", to identify a phantom projection and responsively determine a vehicle action, in accordance with an embodiment of the present invention.

FIG. 5 is a schematic flow diagram of a set of CNNs, including the aspect models and the combiner model, the diagram showing an exemplary implementation of the present invention. To train and test the CNN models, videos were produced by a camera positioned in a vehicle while in the vehicle was driven around a typical city. A first set of videos was created while driving through the city without displaying phantom projections, while a second set of videos was recorded while driving around an area of the city where phantom traffic signs were projected. For the second set, 40 different types of phantom projections of traffic signs were projected onto nine different surfaces.

After the videos were created, a traffic sign detector was executed to detect the traffic signs in both sets, according to the methods described in Alvaro Arcos-Garcia, et al., "Evaluation of deep neural networks for traffic sign detection systems," *Neurocomputing* 316 (2018), 332-344, which is incorporated herein by reference. To train the context model, images that did not contain traffic signs were also created to teach the context model to distinguish proper from improper placement context. Context images were cropped and rescaled as described above, with blank centers. The other aspect images were processed, cropped and rescaled as described above.

The context, surface, light, and depth models were trained separately, and then the combiner model was trained from "embeddings" of inner layers of the aspect models, as described below. In the exemplary implementation, 80% of the test images were used to train the models, and the remaining 20% were used to evaluate models as a test set. To reduce bias, the test set also contained video frames with phantom projections on surfaces that were not in the training set. It may be noted that training was performed on an NVIDIA 2080TI GPU for 25 epochs.

The four aspect models—context, surface, light, and depth—may be configured with multiple CNN layers, as indicated in the figure. The different aspect models may be optimized with different layer configurations; however, in the implementation shown, the models have the same layer architectures. As indicated in the figure, layer (1) may have, for example, 16 filters and a resolution of 128×128 pixels; layer (2) may have 32 filters and a resolution of 64×64; layer (3) may have 64 filters and a resolution of 32×32. Resolutions of additional layers (4), (5), and (6) may be, respectively, 16×1, 4×1, and 2×1.

Layer (6) of the aspect CNN models is shown as a "softmax" layer, which is a type of layer that generates a binary output of 0 or 1. Such a final layer is applied to indicate whether or not the detected image is a phantom projection. As indicated in the figure, the combiner model does not receive as input the binary output of the final layer, but instead receives output of an inner layer of the aspect model. In implementation show, layer (5) is used. Using an inner layer, also referred to as a "latent representation" or "embedded layer" of each respective aspect model, is more robust for creating the combiner model.

The latent representations are combined as a summary vector for input to the combiner model. Summary vectors from the test data are used to train the combiner model, and, similarly, during operation, summary vectors are fed to the combiner model to determine if detected objects of acquired images are phantom projections. The output of combiner model may also be a binary output, indicated whether or not a detected object is a phantom projection. Alternatively, the output may be a likelihood of a phantom projection, the relevance of which may be subsequently determined by the decision module 114.

An alternative to the committee of experts approach implemented by the combiner model could be to train a convolutional neural network (CNN) to correlate a single image cropped to a region of a detected object, rather than created multiple models for different image aspects. However, this approach would make the CNN reliant on specific features that are most predominant in the decision process, giving less weight to anomalies that are less prominent. For example, the light intensity of a traffic sign was shown to be a prominent feature for distinguishing between real and projected signs. A CNN trained on real and phantom traffic sign images may primarily focus on the light level, giving relatively less weight to anomalies of surface, context and depth. As described below, the committee of experts approach is more resilient to different types of anomalies in acquired images. This resilience, in turn, serves to increase the true positive rate (TPR) of detection, i.e., the rate at which phantom projections are accurately identified (as a percent of the total number of phantom projections), without increasing the false positive rate (FPR), i.e., the rate at which real objects are falsely flagged as phantoms (as a percent of the total number of real objects).

The combination models, like the single model, can be tuned for different TPR or FPR thresholds, as there is a trade-off between the two prediction thresholds. That is, a lower threshold will decrease the FPR but often decrease the TPR as well. For autonomous vehicles, it is generally preferably for safety reasons that a real object will always be identified as real (i.e., an FPR of zero), even if this means that phantom projections are also more frequently incorrectly classified as real (giving a lower TPR). Even a small FPR could make the solution impractical if it meant that a real obstacle was not avoided or a real traffic sign was ignored. Therefore, a threshold value was set at which the FPR is zero. As can be seen in Table 1 below, the proposed full model (C+S+L+D) out-performs all other model combinations, as well as a baseline model of a single CNN classifier. As noted above, the combined model outperforms the baseline model because it focuses on the relevant information and is less dependent on any one aspect/feature

TABLE 1

True positive rates (TPRs) of detecting phantom projections, using different combinations of aspect models, when threshold of false positive rate (FPR) on the test set is set to zero. (C: "Context Model"; S: "Surface Model"; L: "Light Model"; D: "Depth Model").

| Model Combination | TPR |
|---|---|
| C | 0.049 |
| S | 0.796 |
| L | 0.0.17 |
| D | 0.150 |
| C + S | 0.986 |
| C + L | 0.221 |
| C + D | 0.725 |
| S + L | 0 |
| S + D | 0.990 |
| L + D | 0.985 |
| C + S + L | 0.667 |
| C + S + D | 0.987 |
| C + L + D | 0.987 |
| S + L + D | 0.993 |
| single CNN | 0.906 |
| C + S + L + D | 0.994 |

Figure 6A:
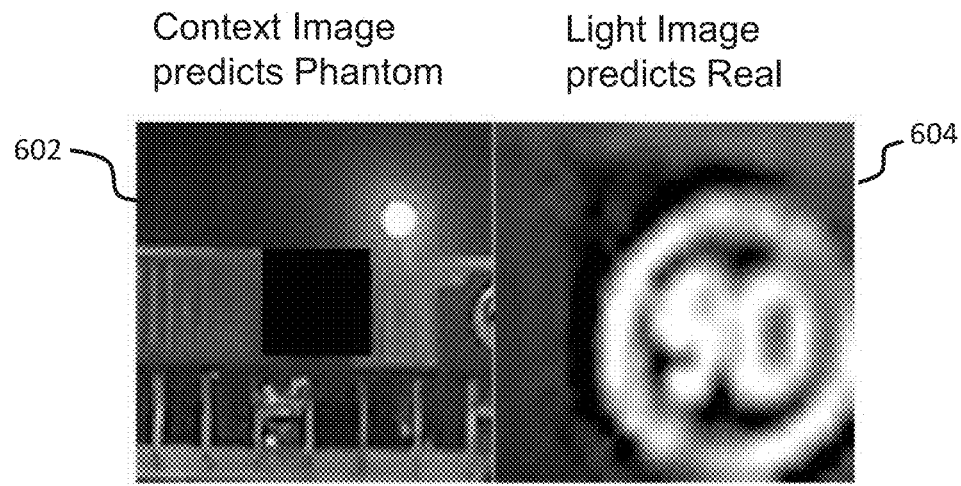
FIGS. 6A and 6B are images that were processed to highlight different aspects of acquired images, when detected objects in the acquired images were real traffic objects, in accordance with an embodiment of the present invention.
Figure 6B:
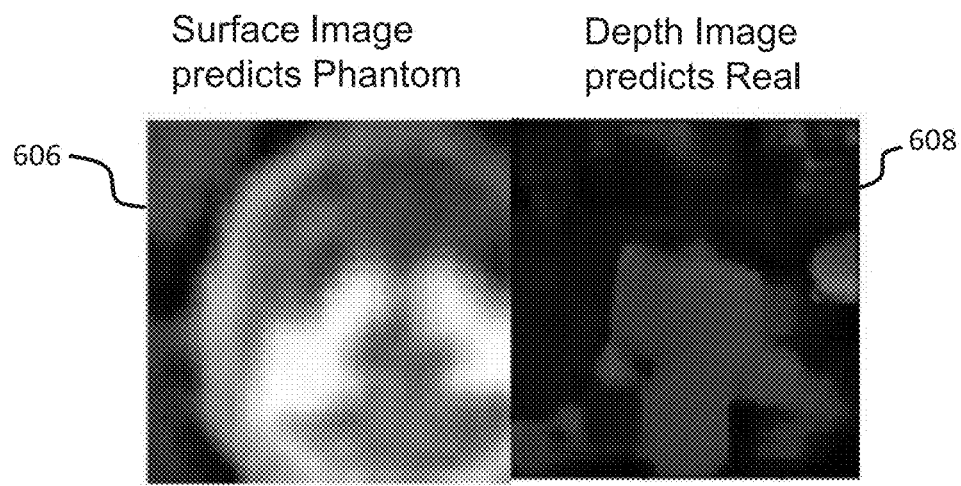

FIGS. 6A and 6B show pairs of aspect images, each pair derived from a different scene in which the detected object was real. For each scene, the aspect models made different predictions regarding whether the detected object was real or a phantom, but the combined model made the correct prediction. FIG. 6A shows that the context model, based on a context image 602, incorrectly predicted that the detected object was a phantom projection, whereas the light model, based on a light image 604, made the correct prediction that the detected object was real.

FIG. 6B similarly shows that the surface model, based on a surface image 606, incorrectly predicted that the detected object was a phantom projection, whereas the light model, based on a light image 608, made the correct prediction that the detected object was real.

Figure 7A:
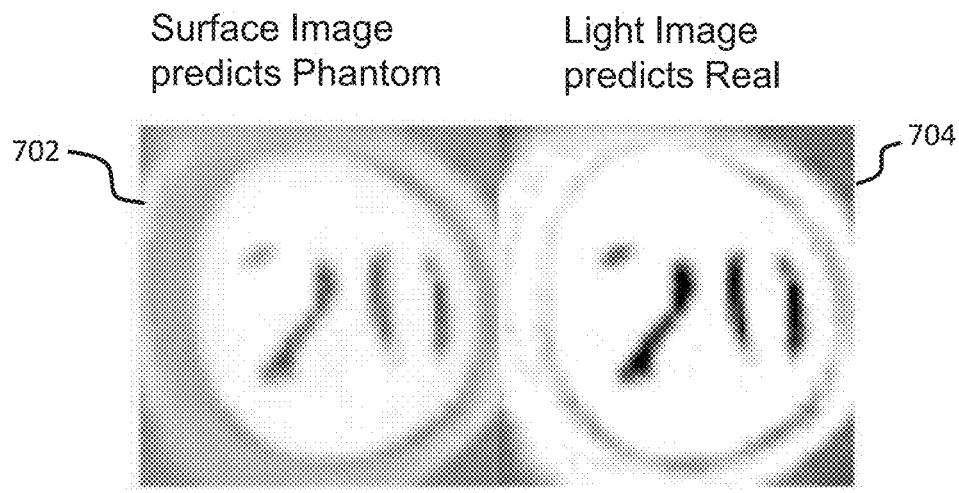
FIGS. 7A and 7B are images that were processed to highlight different aspects of acquired images, when detected objects in the acquired images were phantom projections, in accordance with an embodiment of the present invention.
Figure 7B:
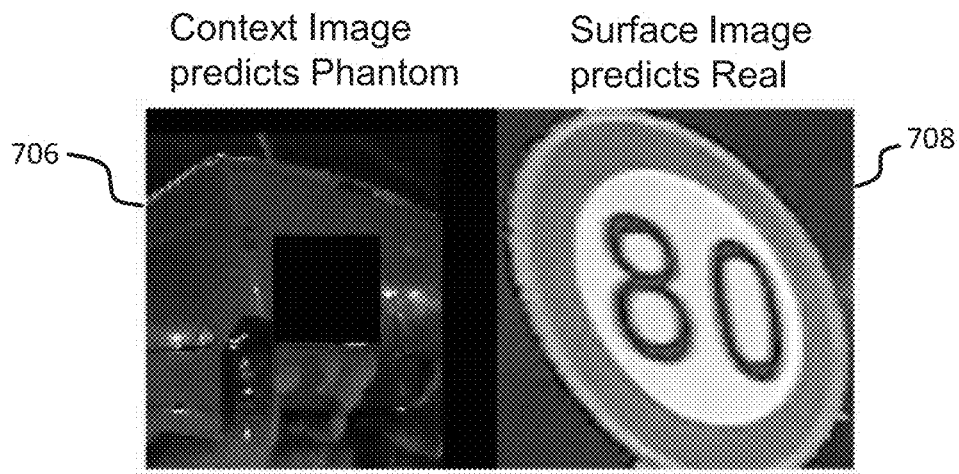

Similarly, FIGS. 7A and 7B show pairs of aspect images, each pair derived from a different scene in which the detected object was a phantom projection. For each scene, the aspect models made different predictions regarding whether the detected object was real or a phantom, but the combined model made the correct prediction. FIG. 7A shows that the surface model, based on a surface image 702, correctly predicted that the detected object was a phantom projection, whereas the light model, based on a light image 704, made the incorrect prediction that the detected object was real.

FIG. 7B similarly shows that the context model, based on a context image 706, correctly predicted that the detected object was a phantom projection, whereas the surface model, based on a surface image 708, made the correct prediction that the detected object was real.

A combined model, which analyzes multiple images highlighting different aspects of an acquired image, is therefore generally shown to be more resilient to phantom projection attacks than models based on individual images.

It is to be understood that all or part of ADAS 100 and of the process 200 implemented by the ADAS may be implemented in digital electronic circuitry, or in computer hardware, firmware, software, or in combinations thereof. The computing system may have one or more processors and one or more network interface modules. Processors may be configured as a multi-processing or distributed processing system. Network interface modules may control the sending and receiving of data packets over networks. Security modules control access to all data and modules. All or part of the system and process can be implemented as a computer program product, tangibly embodied in an information carrier, such as a machine-readable storage device or in a propagated signal, for execution by, or to control the operation of, data processing apparatus, such as a programmable processor, computer, or deployed to be executed on multiple computers at one site or distributed across multiple sites. Memory storage may also include multiple distributed memory units, including one or more types of storage media.

Method steps associated with the system and process can be rearranged and/or one or more such steps can be omitted to achieve the same, or similar, results to those described herein. It is to be understood that the embodiments described hereinabove are cited by way of example, and that the present invention is not limited to what has been particularly shown and described hereinabove. Rather, the scope of the present invention includes variations and modifications thereof which would occur to persons skilled in the art upon reading the foregoing description and which are not disclosed in the prior art.

The invention claimed is:

1. A method for protecting a vehicle employing an advanced driver-assistance system (ADAS) from a phantom projection attack, the method comprising:
receiving an image from an image sensor, wherein the received image includes surroundings of the vehicle;
processing the received image to identify a traffic object in the image;
creating multiple processed images from the received image, wherein each processed image highlights a different distinct aspect of the image;
applying the multiple processed images to multiple respective neural network (NN) aspect models trained to correlate the distinct aspect of each processed image with a phantom projection attack;
applying latent representations of the multiple processed images from each of the NN aspect models to a NN combiner model trained to determine whether the latent representations indicate a phantom projection attack; and
responsively to a determination by the NN combiner model that there is a phantom projection attack, issuing a phantom projection indicator to a decision module of the ADAS.

2. The method of claim 1, further comprising applying the phantom projection indicator to a process for determining a vehicle action implemented by the decision module.

3. The method of claim 1, wherein the traffic object is one of a traffic sign, a traffic light, a road obstacle, a second vehicle, and a pedestrian.

4. The method of claim 1, wherein the multiple NN aspect models include four models: a context model, a surface model, a light model, and a depth model.

5. The method of claim 1, wherein the multiple NN aspect models include a context model, wherein the processed image applied to the context model is generated by centering a region of the received image around the identified traffic object and blanking the identified traffic object from the processed image.

6. The method of claim 1, wherein the NN aspect models include a surface model, wherein the processed image applied to the surface model is generated by cropping the received image to a region of the identified traffic object.

7. The method of claim 6, wherein the surface model includes a correlation between unrealistic patterns in the processed image with a phantom projection attack.

8. The method of claim 1, wherein the NN aspect models include a light model, wherein the processed image applied to the light model is generated by cropping the received image to a region of the identified traffic object and converting each pixel of the image to the value of the maximum of the red, green, or blue value of the pixel.

9. The method of claim 1, wherein the NN aspect models include a depth model, wherein the processed image applied to the depth model is generated by cropping the received image to a region of the identified traffic object and converting each pixel of the image to a value representing a direction and magnitude of an optical flow, indicating a transition of a pixel from a pixel position in a prior received image.

10. The method of claim 1, wherein identifying the traffic object comprises identifying multiple traffic objects and applying the aspect models and the combiner model to determine the likelihood output for each of the multiple traffic objects.

11. An advanced driver-assistance system (ADAS) for protecting a vehicle against a phantom projection attack, the system comprising a processor having memory including instructions, which when executed by the processor implement steps of:
receiving an image from an image sensor, wherein the received image includes surroundings of the vehicle;
processing the received image to identify a traffic object in the image;
creating multiple processed images from the received image, wherein each processed image highlights a different distinct aspect of the image;
applying the multiple processed images to multiple respective neural network (NN) aspect models trained to correlate the distinct aspect of each processed image with a phantom projection attack;
applying latent representations of the multiple processed images from each of the NN aspect models to a NN combiner model trained to determine whether the latent representations indicate a phantom projection attack; and
responsively to a determination by the NN combiner model that there is a phantom projection attack, issuing a phantom projection indicator to a decision module of the ADAS.

12. The system of claim 11, wherein the steps further applying the phantom projection indicator to a process for determining a vehicle action performed by the decision module.

13. The system of claim 11, wherein the traffic object is one of a traffic sign, a traffic light, a road obstacle, a second vehicle, and a pedestrian.

14. The system of claim 11, wherein the NN aspect models include four models: a context model, a surface model, a light model, and a depth model.

15. The system of claim 11, wherein the NN aspect models include a context model, wherein the processed image applied to the context model is generated by centering a subset region of the received image around the identified traffic object and blanking the identified traffic object from the processed image.

16. The system of claim 11, wherein the NN aspect models include a surface model, wherein the processed image applied to the surface model is generated by cropping the received image to the region of the identified traffic object.

17. The system of claim 16, wherein the surface model includes a correlation of unrealistic patterns in the processed image with a phantom projection attack.

18. The system of claim 11, wherein the NN aspect models include a light model, wherein the processed image applied to the light model is generated by cropping the received image to the region of the identified traffic object and converting each pixel of the image to the value of the maximum of the red, green, or blue value of the pixel.

19. The system of claim 11, wherein the NN aspect models include a depth model, wherein the processed image applied to the depth model is generated by cropping the received image to the region of the identified traffic object and converting each pixel of the image to a value representing a direction and magnitude of an optical flow, indicating a transition of the pixel from a position in a prior received image.

20. The system of claim 11, wherein identifying the traffic object comprises identifying multiple traffic objects and applying the aspect models and the combiner model to determine the likelihood output for each of the multiple traffic objects.

\* \* \* \* \*